UNITED STATES PATENT OFFICE.

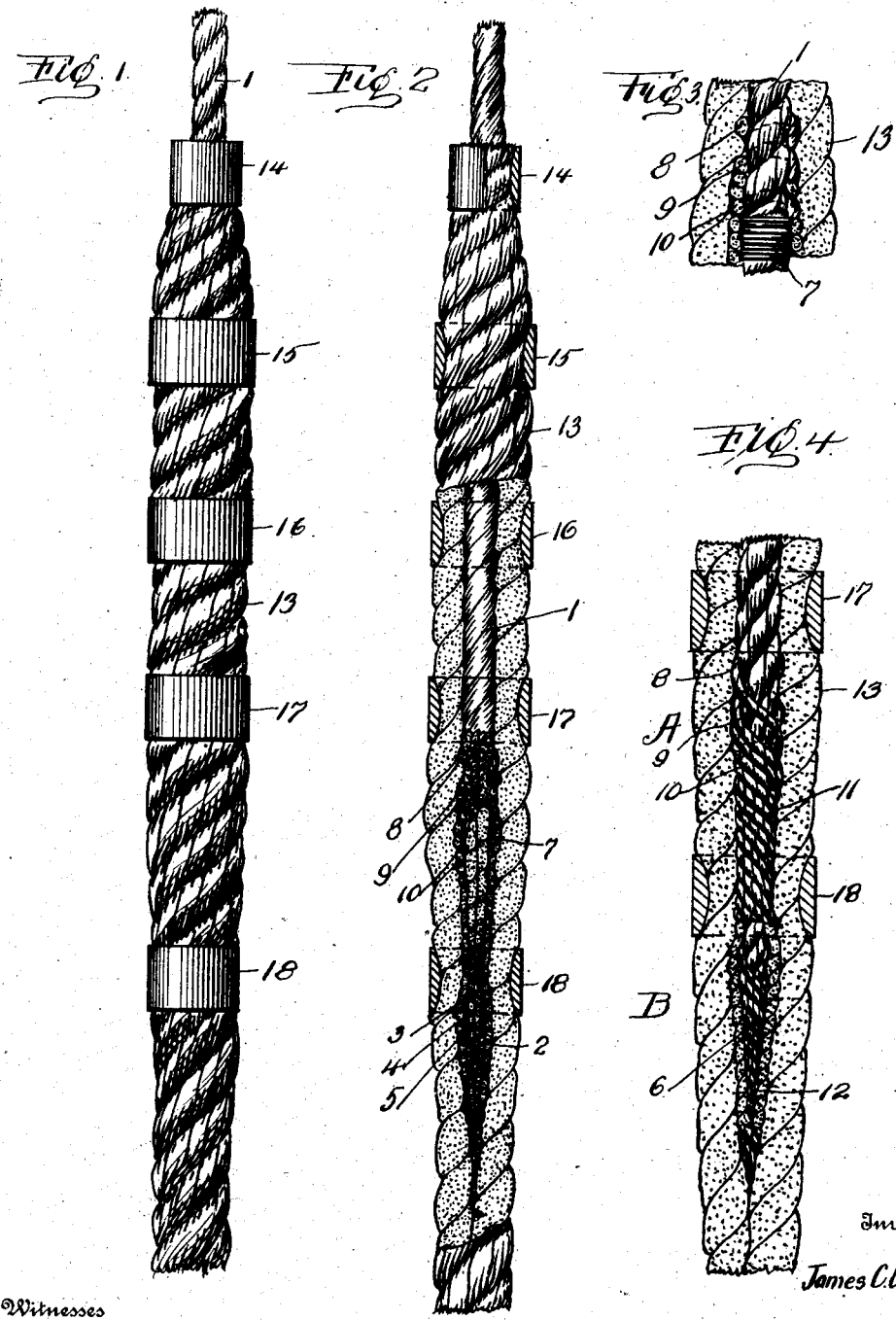

JAMES C. WALLY, OF KITTANNING, PENNSYLVANIA.

WELL-DRILLING APPARATUS.

No. 878,916.     Specification of Letters Patent.     Patented Feb. 11, 1908.

Application filed December 2, 1907. Serial No. 404,815.

*To all whom it may concern:*

Be it known that I, JAMES C. WALLY, a citizen of the United States of America, residing at Kittanning, in the county of Armstrong and State of Pennsylvania, have invented certain new and useful Improvements in Well-Drilling Apparatus, of which the following is a specification, reference being had therein to the accompanying drawing.

This invention relates to a splice for connecting a wire cable and a manila or rope cable, and the primary object of the invention is, to provide novel means for securely joining a wire cable and a manila cable.

My invention aims to provide a splice, particularly designed for oil, gas and Artesian well drawing apparatus. The splice is particularly adapted for connecting a wire drilling cable and a manila drilling cable, the former being used in seventy-five per cent. of a well. For instance, in a four thousand foot well, a wire cable extends down from the top of a well for the distance of 3,150 feet, and splice then occurs for a manila cable 800 feet in length, and from the end of this manila cable is suspended the drilling tools, these tools being approximately fifty feet in length. It will therefore appear that upon the splice depends the safety of the drilling tools, and heretofore considerable trouble has been experienced by the manila cable becoming detached from the wire cable, due to the weight of the tools when lowering and raising the same in a well.

In connecting a manila cable to a wire cable, the weight of the drilling tools will be supported principally from the wire cable, thereby insuring a more reliable and safe drilling operation.

The novel manner in which my splice is accomplished will be presently described, and then specifically set forth in the appended claims.

In the drawing: Figure 1 is a side elevation of a splice connection embodying my invention, Fig. 2 is a vertical sectional view of the same, partly in elevation, Fig. 3 is a fragmentary sectional view illustrating the manner of binding a wire cable, and Fig. 4 is a sectional view of the splice, illustrating the manner of producing enlargements in a manila cable for retaining bands or sleeves.

In the accompanying drawings, 1 designates the end of a wire cable, which is wound or bound by strands of wire 2 to prevent the end of the wire cable from becoming unraveled. Prior to binding the end of the cable, I insert strands of manila rope 3, 4 and 5 through the cable above the wire strands 2. The ends of the strands of manila rope 3, 4 and 5 are then wound around the wire cable, as designated at 6.

The wire cable 1 a short distance above the insertion of the strands 3, 4 and 5 is bound or wound with wire, as at 7, and three more strands of manila rope 8, 9 and 10 are inserted through the wire cable above the binding 7. The strands 8, 9 and 10 are now wrapped around the wire cable as at 11, and around the strands 3, 4 and 5, as at 12, producing two enlargements which I have designated A and B. The manila cable 13 is now wrapped upon the wire cable, and a small band or sleeve 14 placed over the upper end of the manila cable. This is accomplished by moving the band or sleeve 14 over the wire cable until it reaches the upper end of the manila cable. The manila cable lying over the wire cable is now compressed as much as possible to permit of four bands or sleeves 15, 16, 17 and 18 being placed upon the end of the manila cable. The bands or sleeves 14 to 18 inclusive have their inner surfaces rounded to adapt them to tightly grip the manila cable 13. The band or sleeve 18 is located above the enlargement B, the band or sleeve 17 above the enlargement A, and the bands 15 and 16 arranged intermediate the bands 14 and 17.

The enlargements A and B make it impossible for the manila cable to slip off of the wire cable, and by binding the wire cable as at 2 and 7, the strands of manila rope are prevented from becoming detached.

The means of connecting a manila cable with a wire cable as above described offers a strong and durable connection, insuring the required flexibility and also permitting of renewal of the connection when necessary.

Having now described my invention what I claim as new, is:—

1. The combination with a wire cable, and a manila cable, of bindings placed upon the ends of said wire cable, strands of manila rope inserted through said wire cable and wound upon the end of said wire cable to produce enlargements, said manila cable having its end wound over said wire cable, a plurality of bands or sleeves embracing said manila cable, said bands or sleeves being arranged above said enlargements.

2. The combination of a wire cable, strands of manila rope inserted in said cable and wound around the end thereof to produce enlargements, a manila cable wrapped over the enlargements at the end of said wire cable, and bands or sleeves embracing said manila cable and having inner rounded surfaces for gripping said manila cable.

In testimony whereof I affix my signature in the presence of two witnesses.

JAMES C. WALLY.

Witnesses:
 H. A. HEILMAN,
 MAX H. SROLOVITZ.